H. C. Case,
Cage Trap.
No. 100,599.     Patented Mar. 8, 1870.
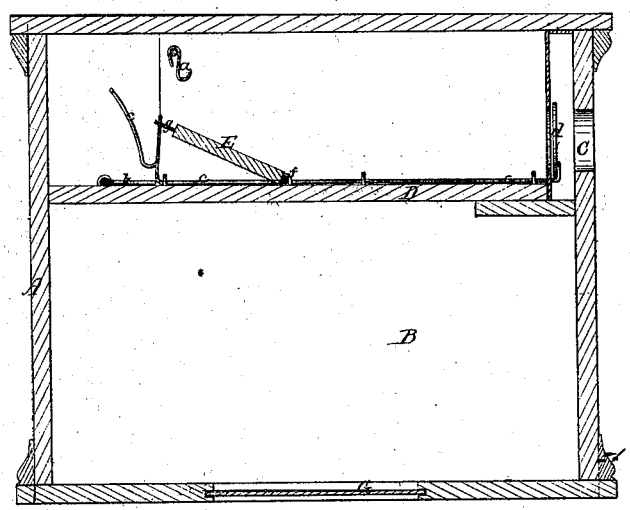
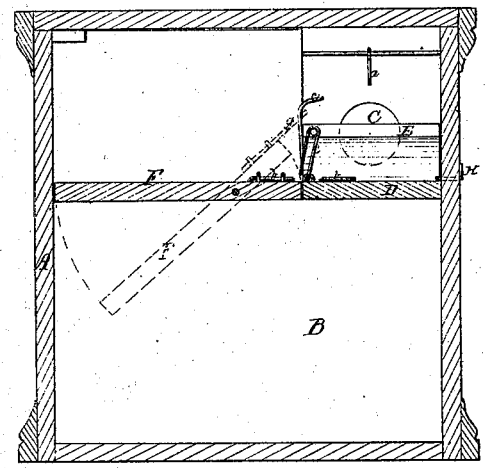
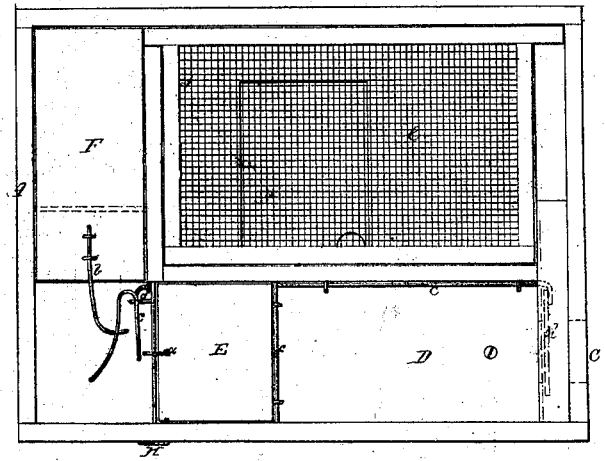

United States Patent Office.

HENRY C. CASE, OF PEKIN, ILLINOIS.

Letters Patent No. 100,599, dated March 8, 1870.

IMPROVED ANIMAL-TRAP.

The Schedule referred to in these Letters Patent and making part of the same.

*To all whom it may concern:*

Be it known that I, HENRY C. CASE, of Pekin, Tazewell county, State of Illinois, have invented a new and improved "Automatic Self-Setting Animal-Trap," of which the following is a full and exact description, reference being had to the accompanying drawings and the letters of reference marked thereon, forming part of this specification, of which—

Figure 1 represents a longitudinal section;
Figure 2, a vertical section; and
Figure 3, a top view.

I will now proceed to describe its construction and operation.

A represents the box or trap-case.

B is the pit into which the animals fall.

C is the entrance to the trap where the animal enters.

D is the platform inside the trap, on which are the drop E, over the bait $a$, and the balance-drop F.

G is a movable bottom to the trap, out of which the animals are taken when caught.

$b$ is a wire, attached to the balance-drop F.

$c$ is another wire, bent in the manner shown in the drawings, and extending along and through the platform, and connecting with the trap-door $d$.

$e$ is a wire opening to the top of the well or pit B.

$f$ is a wire upon which the drop E is hinged.

H is a fastening to fasten the drop E, when required.

The operation of my trap is as follows:

I first put the bait on the bait-hook $a$. Then by pressing down the further end of the balance-drop F, the trap is set. The wire $b$, coming in contact with the wire $c$, raises the drop E and the trap-door $d$ simultaneously. The animal climbs up the outside of the trap A, enters the trap-hole C, and when it comes to the bait on the hook $a$, it, by its own weight, causes the drop E to fall, which closes the door $d$.

He is now safely in the cage or trap. Finding himself thus caged, he runs up and down the platform D inside the trap, until he comes at the end of the balance-drop F, which, by his weight, he causes to open, and precipitates himself into the well or pit B.

It will be seen that by this action the trap is again set, because the wire $b$, connected with the balance-drop F, will instantaneously operate on the wire $c$, and raise the drop E and the trap-door $d$.

The little reversible wire H is intended to fasten the two drops E and F, when required.

$g$ is a wire attached to the drop E, and is operated upon by the wires $b$ and $c$.

Having thus described my invention,

What I claim as new, and desire to secure by Letters Patent, is—

The trap-box A, the pit B, the platform D, the drops E and F, in combination with the wires $c$ and $b$, and $g$, and trap-door $d$, and movable bottom G, all constructed, operated, and arranged as described, and for the uses and purposes set forth.

H. C. CASE.

Witnesses:
M. F. CASE,
LOT BERGSTRESSER.